(12) United States Patent
Yamaguchi

(10) Patent No.: US 8,139,450 B2
(45) Date of Patent: Mar. 20, 2012

(54) AMPLIFIER CIRCUIT AND OPTICAL PICKUP DEVICE

(75) Inventor: Hiroshi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/037,958

(22) Filed: Mar. 1, 2011

(65) Prior Publication Data

US 2011/0188366 A1 Aug. 4, 2011

Related U.S. Application Data

(63) Continuation of application No. PCT/JP2010/004701, filed on Jul. 22, 2010.

(30) Foreign Application Priority Data

Nov. 18, 2009 (JP) ................. 2009-263190

(51) Int. Cl.
*G11B 7/00* (2006.01)

(52) U.S. Cl. ................. 369/44.41; 369/124.12
(58) Field of Classification Search ............... 369/44.41, 369/44.42, 44.34, 124.01, 124.1, 124.12, 369/124.14, 124.15

See application file for complete search history.

(56) References Cited

U.S. PATENT DOCUMENTS

| 5,287,340 A | * | 2/1994 | Chapman et al. .......... 369/44.41 |
| 2008/0158043 A1 | | 7/2008 | Ishio et al. |

FOREIGN PATENT DOCUMENTS

| JP | 07-135489 | 5/1995 |
| JP | 2002-092882 | 3/2002 |
| JP | 2006-269863 | 10/2006 |
| JP | 2008-020204 | 1/2008 |
| JP | 2008-234811 | 10/2008 |

\* cited by examiner

*Primary Examiner* — Nabil Hindi
(74) *Attorney, Agent, or Firm* — McDermott Will & Emery LLP

(57) ABSTRACT

An amplifier circuit and an optical pickup device supporting multi-layered optical discs and hi-speed play mode. The amplifier circuit includes photodiodes 11 to 15; operational amplifiers 21 to 25; feedback resistors 31 to 34; resistors 41 to 45; output terminals 51 to 55; reference voltage sources 56 and 57; a reverse-bias-voltage control circuit 61; and a parasitic-capacitance detecting circuit 65. The reverse-bias-voltage control circuit 61 is connected to the cathodes of the photodiodes 11 to 15. The parasitic-capacitance detecting circuit 65 detects the parasitic capacitance of the photodiode 15. The reverse bias voltage generated in the reverse-bias-voltage control circuit 61 is adjusted according to the detection result by the parasitic-capacitance detecting circuit 65, so that the optical sensitivity of the photodiodes 11 to 14 is maintained at an appropriate value.

9 Claims, 12 Drawing Sheets

61 REVERSE-BIAS-VOLTAGE CONTROL CIRCUIT

AMPLIFIER CIRCUIT AND OPTICAL PICKUP DEVICE

CROSS-REFERENCE TO RELATED APPLICATION

This is a continuation of PCT International Application PCT/JP2010/004701 filed on Jul. 22, 2010, which claims priority to Japanese Patent Application No. 2009-263190 filed on Nov. 18, 2009. The disclosures of these applications including the specifications, the drawings, and the claims are hereby incorporated by reference in their entirety.

TECHNICAL FIELD

The present invention relates to an amplifier circuit and an optical pickup device for amplifying a signal from a photodiode.

BACKGROUND ART

In recent years, Blu-ray Disc (BD) have received a lot of attention as a large-capacity recording medium. In comparison with digital versatile disc (DVD), single layer BD has a recording density approximately five times higher, and dual layer BD has the one approximately ten times higher. However, multi layer BD has been expected as a larger-capacity recording medium so that various kinds of large-volume information are enjoyed. Furthermore, with improved data transmission rate, an amplifier circuit which supports higher-speed recording and play mode has also been expected.

FIG. 14 is a circuit configuration diagram illustrating a conventional photodiode amplifier circuit. As illustrated in FIG. 14, in circuit for mixing four-channel signals into an RF signal, 501 to 505 denote operational amplifiers, 511 to 514 denote photodiodes, 521 to 524 denote feedback resistors, 531 to 535 denote resistors, 541 to 545 denote output terminals, and 546 and 547 denote reference voltage sources.

The photodiode amplifier circuit is described in details. A laser light reflected from an optical disc is incident on the photodiode 511, and an electric current of an amount corresponding to the amount of the incident light pass through the photodiode 511. The operational amplifier 501 and the feedback resistor 521 are included in a negative feedback circuit. The electric current generated in the photodiode 511 is converted into a voltage through the feedback resistor 521, and then outputted from the output terminal 541 as a voltage signal. Similarly, the electric currents generated in the photodiodes 512 to 514 are converted into voltages through the feedback resistors 522 to 524, and then outputted from the output terminals 542 to 544 as voltage signals, respectively. The currents of the signals from the output terminal 541 to 544 are added up into one signal through the resistors 531 to 534. The signal is amplified in the resistor 535 and the operational amplifier 505, and then outputted to the output terminal 545 as an RF signal.

However, an optical disc suffers from a lower reflectivity if the disc is a multi-layered one or if the disc is played in hi-speed play mode. The amount of the laser light incident on the photodiodes 511 to 514 becomes smaller, thereby reducing signal quality. As a result, the information recorded on the disc cannot be read. In order to solve this problem, the amplification factor of the amplifier circuit has to be larger by increasing the resistance values of the feedback resistors 521 to 524. However, the resistance values of the feedback resistors 521 to 524 are increased, the thermal noise generated in the feedback resistors 521 to 524 is increased, thereby worsening the signal-to-noise ratio in the result. On the other hand, each of the photodiodes 511 to 514 has a parasitic capacitance. The capacitance value of each parasitic capacitance is determined by the size of each of the photodiodes 511 to 514. The sizes of the photodiodes 511 to 514 are determined by the components of the optical system, so there is a natural limit to the capacitance values of the photodiodes 511 to 514. As a result, in the pole frequency, which is determined by the feedback resistors 521 to 524 and the capacitance values of the photodiodes 511 to 514, the frequency band is limited. This means that further higher-speed play mode becomes difficult. Blu-ray Discs are facing a problem that the improvements in signal-to-noise ratio and speeding up are not achieved at the same time.

In order to solve these problems, Japanese Patent Publication No. 2002-92882 has proposed a photodiode amplifier circuit in which an avalanche photodiode (hereinafter, referred to as APD) employed for photodiode, and Japanese Patent Publication No. 2008-234811 has proposed a photodiode amplifier circuit in which one ends of the photodiode terminals are connected to a common node to generate an RF signal. FIG. 15 is a circuit configuration diagram illustrating a conventional photodiode amplifier circuit in which an avalanche photodiode according to Japanese Patent Publication No. 2002-92882 is employed. FIG. 16 is a circuit configuration diagram illustrating a photodiode amplifier circuit according to Japanese Patent Publication No. 2008-234811, in which one-end sides of photodetectors are connected to a common node to generate an RF signal.

In FIG. 15, 601 denotes a laser light source, 602 denotes a collimator lens, 603 denotes a polarizing beam splitter, 604 denotes a quarter-wave plate, 605 denotes an object lens, 606 denotes an optical disc, 607 denotes a beam splitter, 608, 609 and 612 denote photodetectors, 610 denotes a detecting lens, 611 denotes a cylindrical lens, 613 denotes a comparator, 614 denotes a reverse-bias-voltage control circuit, and 615 denotes a fixed-voltage selector.

The photodiode amplifier circuit of FIG. 15 is described in details. A laser light emitted from the laser light source 601 is converted from divergent light to parallel light by the collimator lens 602. The parallel laser light is split by the polarizing beam splitter 603 into the laser light directed to the optical disc 606 and the laser light directed to the photodetector 608. After passing through the quarter-wave plate 604, the laser light directed to the optical disc 606 is concentrated with the object lens 605, and applied onto the optical disc 606. The applied laser light is reflected from the optical disc 606. The reflected laser light is directed to the photodetector 612 through the object lens 605, the quarter-wave plate 604, and the polarizing beam splitter 603. The laser light directed to the photodetector 612 is incident on the photodetector 612 through the detecting lens 610 and the cylindrical lens 611. The photodetector 612 detects the signal information of the optical disc 606 according to laser light intensity. Furthermore, the laser light directed toward the photodetector 608 is split by the beam splitter 607 into the laser light directed to the photodetector 608 and the laser light directed to the photodetector 609. The photodetector 608 detects the light amount of the laser light source 601, and gives the detection result to the laser light source 601 as feedback, so that the laser light source 601 has a constant light amount. On the other hand, the laser light directed to the photodetector 609 is incident on the photodetector 609, and the photodetector 609 detects the voltage corresponding to the light amount of the laser light source 601. The comparator 613 makes a comparison between the voltage value detected by the photodetector 609 and the voltage value selected by the fixed-voltage selector 615. Based on the comparison result of the comparator 613, the reverse-bias-voltage control circuit 614 generates a reverse bias voltage. The generated reverse bias voltage is applied to the photodetectors 609 and 612, thereby controlling the reverse bias voltages of the photodetectors 609 and 612. This configuration achieves a highly sensitive but stable amplifier which can resist environmental changes, such as temperature.

Next, the photodiode amplifier circuit of FIG. 16 is described. In FIG. 16, 701 to 705 denote operational amplifiers, 711 to 714 denote photodiodes, 721 to 724 and 735 denote feedback resistors, 741 to 745 denote output terminals, 746 and 747 denote reference voltage sources, 751 denotes an inductor, and 752 and 753 denote capacitances.

The operation of the photodiode amplifier circuit of FIG. 16 is hereinafter described. A laser light is incident on the photodiode 711, and the photodiode 711 then generates the electric current corresponding to the incident light amount. The operational amplifier 701 and the feedback resistor 721 are included in a negative feedback circuit. As the electric current is generated in the photodiode 711, the electric current passing through one end thereof is converted into a voltage through the feedback resistor 721 and the operational amplifier 701, and then outputted from the output terminal 741 as a signal. Similarly, the electric currents generated in the photodiodes 712 to 714 are converted into voltages through the feedback resistors 722 to 724, and then outputted from the output terminals 742 to 744 as signal, respectively. The electric currents generated in the photodiodes 711 to 714 passing from the other ends thereof are added up into one electric current signal. The electric current signal is inputted to an amplifier including the operational amplifier 705 and the feedback resistor 735 through the inductor 751. The inputted electric current signal is converted into a voltage signal by the feedback resistor 735 and the operational amplifier 705, and then outputted from the RF output terminal 745 as an RF signal.

As has been described above, the photodiode amplifier circuit according to Japanese Patent Publication No. 2002-92882 employs an APD as a photodiode of each photodetector. Therefore, the photodiode amplifier circuit according to Japanese Patent Publication No. 2002-92882 has an optical sensitivity several times to dozen times greater than the case in which a common PIN photodiode is employed therefor. Specifically, as the optical sensitivity becomes higher, the signal becomes larger in amplitude. Therefore, the ratio of signal to noise becomes larger, with the result that the signal-to-noise ratio is improved, thereby further improving signal quality.

In the photodiode amplifier according to Japanese Patent Publication No. 2008-234811, the four-channel photodiodes share one anode, so four-channel electric currents generated in the respective photodiodes are added up into one signal. The signal is converted into an RF signal through the feedback resistors. Therefore, the thermal noise becomes one-fourth and the noise level of the RF terminal 745 is reduced by 6 dB, in comparison with the case in which a single photodiode is employed. Therefore, the ratio of noise to signal becomes smaller, with the result that the signal-to-noise ratio is improved, thereby further stabilizing signal quality.

SUMMARY

However, the conventional amplifier circuit according to Japanese Patent Publication No. 2002-92882 does not achieve a stable operation. Specifically, as is clear from FIG. 15, there are a large number of optical system components in the optical path between the photodetector 609 and the laser light source 601, for controlling the stable operation of the avalanche photodiode (APD). In such a configuration, if the amplifier circuit is used in a motor vehicle or for mobile equipment, which are subject to vibration or shocks, the collimator lens 602, the polarizing beam splitter 603, and the beam splitter 607 are displaced from their normal positions. In this case, the optical axis of the laser light incident on the photodetector 609 is also displaced from its normal position, thereby preventing the laser light of an appropriate amount from being incident on the photodetector 609. As a result, an inaccurate detection result is sent to the comparator 613, causing equipment disoperation.

Furthermore, in the conventional amplifier circuit according to Japanese Patent Publication No. 2002-92882, an emitted laser light is detected by a detector, so that the detection result is used for applying a stable reverse bias voltage to the APD. However, in such a configuration, the reverse bias voltage becomes unstable when the laser light source performs OFF-operation. For example, this configuration becomes unstable when the laser light source switches between ON and OFF at high speed for recording. When information is recorded on the optical disc 606, the laser light source 601 performs multi-pulse operation to make one recorded mark. Specifically, the laser light source 601 switches between ON and OFF. This means that the laser light is incident on the photodetector 609 intermittently while one recorded mark is being made on the optical disc. Therefore, this configuration is disadvantageous in that a stable reverse bias voltage cannot be applied to the photodetector.

On the other hand, the conventional amplifier circuit according to Japanese Patent Publication No. 2008-234811 does not meet basic requirements. Specifically, the conventional amplifier circuit according to Japanese Patent Publication No. 2008-234811 has the following problems. In the amplifier circuit of FIG. 16, the laser lights incident on the photodiodes 711 to 714 are converted into electric currents, and then added up into one current at a common anode. The added electric current is converted into a voltage by the feedback resistor 735 and the operational amplifier 705 through the inductor 751, and then outputted from the RF output terminal 745 as an RF signal. In comparison with the circuit of FIG. 14 in which the signals of the output terminal 541 to 544 are added up into one signal, this amplifier circuit reduces thermal noise to one-fourth of the original amount, and reduces the noise of the RF terminal 745 by 6 dB. However, in order to fully extend the depletion layers of the photodiodes 711 to 714 so that the optical sensitivities thereof are maintained at a conventional level, a reverse bias of at least 1V is required. The reference voltage Vref1 of the terminal 746 is determined by external system specifications. For example, if the supply voltage (Vcc) is 5 V, the reference voltage Vref1 of the terminal 746 is often ½×Vcc=2.5 V by the system specifications. In this case, in order to extend the depletion layers of the photodiodes 711 to 714, the voltage value of the reference voltage Vref2 of the terminal 747 has to be 1.5 V or lower, which is 1 V lower than the reference voltage Vref1 2.5 V of the reference voltage source 746. Since electric currents flow from the cathodes of the photodiodes 711 to 714 toward the anodes thereof, when laser light is applied to the photodiodes 711 to 714, the voltage of the RF output terminal 745 is lower than the reference voltage Vref2. On the other hand, if the lower limit of the voltage of the operational amplifier 705 is set to approximately 0.5 V, the value obtained by subtracting the lower limit 0.5V of the operational amplifier 705 from the voltage 1.5 V carried when no laser light is incident is 1 V as the dynamic range of a signal amplitude, which is a low value. The dynamic range of the RF signal determined by the system specifications of optical pickup devices is often 1.2 V or above, it is difficult to meet the specifications. Moreover, the impedance of the inductance 751 becomes larger as the frequency becomes higher, thereby increasing the impedance viewed from the anodes of the photodiodes 711 to 714. As a result, the conventional amplifier circuit according to Japanese Patent Publication No. 2008-234811 performs unstable operation at high frequencies.

In view of the above, it is an object of the present invention to provide an amplifier circuit and optical pickup device that achieve stable signal quality even when a disc having a low reflectivity is played at higher speed.

Means of Solving the Problem

According to an aspect of the present invention, there is provided an amplifier circuit for converting the light reception current of a photodiode into a voltage. The amplifier circuit includes a first photodiode for receiving light; an amplifier for converting an electric current from the first photodiode into a voltage; a second photodiode different from the first photodiode; a parasitic-capacitance detecting circuit for detecting the parasitic capacitance of the second photodiode; and a reverse-bias-voltage control circuit for controlling the reverse bias voltages of the first photodiode and the second photodiode according to the detection result by the parasitic-capacitance detecting circuit.

In this configuration, the reverse bias voltage of the first photodiode is adjusted in response to the change in the parasitic capacitance of the second photodiode, so that the optical sensitivity of the first photodiode is maintained at an appropriate value. Therefore, this configuration achieves a stable optical sensitivity of the photodiode.

According to an aspect of the present invention, in the amplifier circuit, an avalanche photodiode is employed for the first photodiode and the second photodiode.

In this configuration, since the optical sensitivity of an avalanche photodiode is several times to dozen times greater than the optical sensitivity of a PIN photodiode, stable signal quality is obtained even from a disc having a low reflectivity.

According to an aspect of the present invention, in the amplifier circuit, the second photodiode and the first photodiode has the same parasitic capacitance value.

Since the parasitic capacitance of the second photodiode and the parasitic capacitance of the first photodiode have the same capacitance value, this configuration achieves an amplifier circuit having high and stable optical sensitivity.

According to an aspect of the present invention, in the amplifier circuit, the amplifier has an operational amplifier; a first resistor connected between the input terminal of the operational amplifier and the output terminal of the operational amplifier. The light electric current from the first photodiode is converted into a voltage through the first resistor, and amplified by the operational amplifier.

Since feedback is performed through the operational amplifier having a high gain, this configuration achieves an amplifier circuit having high-band frequency characteristics.

According to an aspect of the present invention, in the amplifier circuit, the parasitic capacitance detector includes a first filter circuit through which the reference signal passes; a second filter circuit through which the reference signal passes; and a phase comparator for making a phase-comparison between the output of the first filter circuit and the output of the second filter.

This configuration reduces the amount of variation in resistance values of the first resistors, thereby achieving a stable signal amplitude.

According to an aspect of the present invention, in the amplifier circuit, the second filter circuit includes a phase delayer for delaying the phase of the reference signal.

In this configuration, the reference signal is inputted to the phase comparator without the amplitude of the second filter changed, so a stable comparison is made.

According to an aspect of the present invention, in the amplifier circuit, the first filter circuit includes a second resistor and the parasitic capacitance of the second photodiode.

This configuration obtains stable output amplitude regardless of temperature change.

According to an aspect of the present invention, in the amplifier circuit, the second resistor and the first resistor have the same resistance value and the same temperature coefficient.

This configuration further obtains a stable output amplitude regardless of temperature change.

According to an aspect of the present invention, there is provided an optical pickup device which has the amplifier circuit.

With the amplifier circuit, this configuration supports various disc types and hi-speed play mode.

As has been described above, the amplifier circuit of the present invention adjusts the reverse-bias voltage value of a photodiode for receiving light, in response to the change in the parasitic capacitance of another photodiode, thereby achieving a stable amplifier circuit resistant to temperature change.

DETAILED DESCRIPTION

Hereinafter, the amplifier circuit and the optical pickup device according to present invention will be described by way of embodiments with reference to the drawings.
(First Embodiment)

Figure 1:
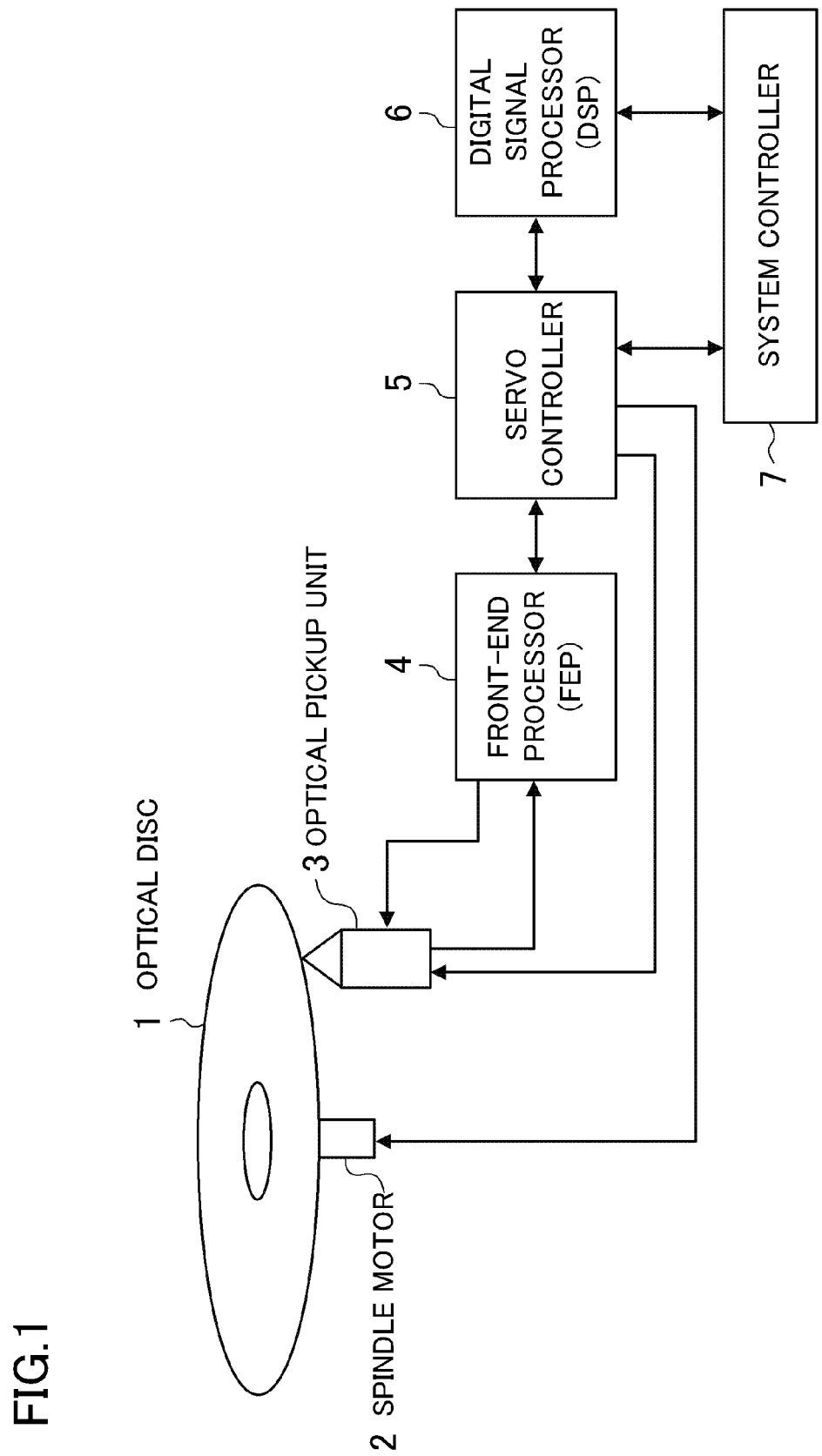
FIG. 1 is a block diagram illustrating the whole configuration of an optical-disc drive which employs an amplifier circuit according to a first embodiment of the present invention.

FIG. 1 illustrates an example of the whole configuration of an optical-disc drive which employs an amplifier circuit according to the present invention. In this case, general front end operations for BD (Blu ray Disc), DVD (Digital Versatile Disc), and CD (Compact Disc) are available.

Referring to FIG. 1, 1 denotes an optical disc (BD, DVD, or CD) put in the optical-disc drive, 2 denotes a spindle motor, 3 denotes an optical pickup unit, 4 denotes a front-end processor (FEP), 5 denotes a servo controller, 6 denotes digital signal processor (DSP), and 7 denotes a system controller. The optical pickup unit 3 applies a laser beam onto the optical disc 1 to detect the light reflected therefrom. The FEP 4 performs processing on the output of the optical pickup unit 3, such as analog operation and filtering. The FEP 4 also sends a predetermined signal to the optical pickup unit 3 depending on the optical disc type and the media type. The servo controller 5 controls the spindle motor 2. The servo controller 5 is also responsible for the focus servo, the tracking servo, and the laser power control of the optical pickup unit 3. The DSP 6 is responsible for digital signal processing such as error correction processing and signal regeneration processing. The system controller 7 controls the optical-disc drive as a whole.

Figure 2:
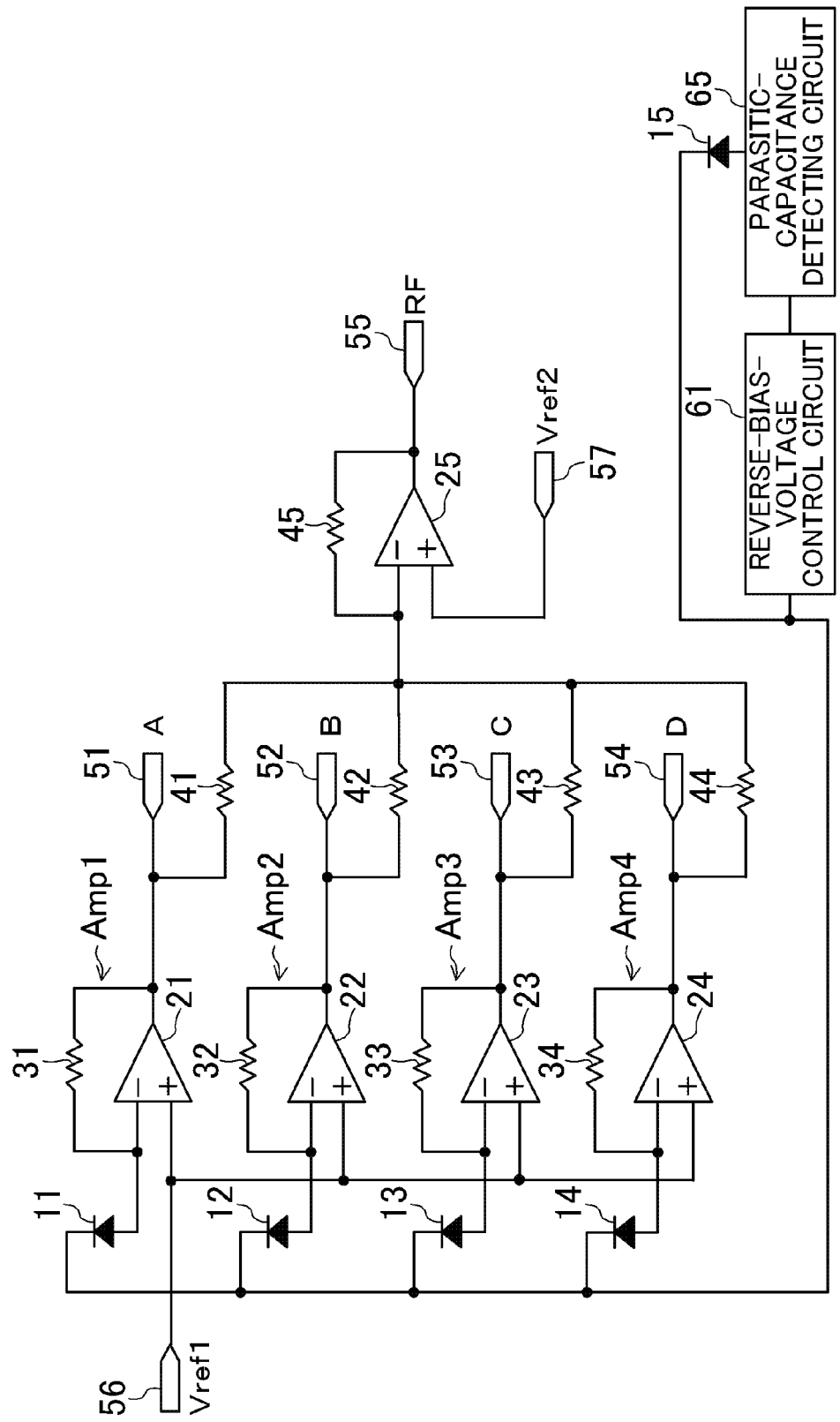
FIG. 2 illustrates an example of the amplifier circuit according to the present invention, included in an optical pickup unit of the optical-disc drive, together with photodiodes.

FIG. 2 illustrates an example of the amplifier circuit according to the present invention, included in the optical pickup unit 3 of FIG. 1, together with photodiodes 11 to 14. The amplifier circuit of FIG. 2 is included in a photodetector IC (PDIC) for converting generated electric current into voltage according to the intensity of the laser light incident on the photodiodes 11 to 14.

Referring to FIG. 2, 11 to 14 denote first photodiodes, 15 denotes a second photodiode different from the first photodiodes 11 to 14 for optimizing the optical sensitivity of the first photodiodes 11 to 14, 21 to 25 denote operational amplifiers, 31 to 34 denote feedback resistors (first resistors), 41 to 45 denote resistors, 51 to 55 denote output terminals, 56 and 57 denote reference voltage source terminals, 61 denotes a reverse-bias-voltage control circuit for applying reverse bias to the first and second photodiodes 11 to 15, and 65 denotes a photodiode-parasitic-capacitance detecting circuit for detecting the parasitic capacitance of the second photodiode 15.

The anode of the first photodiode 11 is connected to the inverting input (−) of the operational amplifier 21 and one end of the feedback resistor 31. The output of the operational amplifier 21 is connected to the other end of the feedback resistor 31, the output terminal 51, and one end of the resistor 41. The anode of the first photodiode 12 is connected to the inverting input (−) of the operational amplifier 22 and one end of the feedback resistor 32. The output of the operational amplifier 22 is connected to the other end of the feedback resistor 32, the output terminal 52, and one end of the resistor 42. The anode of the first photodiode 13 is connected to the inverting input (−) of the operational amplifier 23 and one end of the feedback resistor 33. The output of the operational amplifier 23 is connected to the other end of the feedback resistor 33, the output terminal 53, and one end of the resistor 43. The anode of the first photodiode 14 is connected to the inverting input (−) of the operational amplifier 24, and one end of the feedback resistor 34. The output of the operational amplifier 24 is connected to the other end of the feedback resistor 34, the output terminal 54, and one end of the resistor 44. The feedback resistor 31 and the operational amplifier 21 are included in an amplifier Amp1. The feedback resistor 32 and the operational amplifier 22 are included in an amplifier Amp2. The feedback resistor 33 and the operational amplifier 23 are included in an amplifier Amp3. The feedback resistor 34 and the operational amplifier 24 are included in an amplifier Amp4.

In FIG. 2, the terminal 56 of the reference voltage source 1 (Vref1) is connected to the non-inverting inputs (+) of the operational amplifiers 21, 22, 23, and 24. The other ends of the resistors 41 to 44 are connected to the inverting input (−) of the operational amplifier 25 and the resistor 45. The output terminal of the operational amplifier 25 is connected to the other end of the resistor 45 and the RF output terminal 55. On the other hand, the terminal 57 of the reference voltage source 2 (Vref2) is connected to the non-inverting input (+) of the operational amplifier 25. The reverse-bias-voltage control circuit 61 is connected to the cathodes of the first and second photodiodes 11 to 15. The anode of the second photodiode 15 is connected to the parasitic-capacitance detecting circuit 65. The parasitic-capacitance detecting circuit 65 is connected to the reverse-bias-voltage control circuit 61.

The optical pickup unit 3 of FIG. 1 is placed in the optical-disc drive included in a set package. The inside of the drive is an enclosed space, so has a poor radiation performance. Therefore, the optical sensitivities of the first photodiodes 11 to 14 vary according to environmental changes such as temperature. If the optical sensitivity of the first photodiodes 11 to 14 are affected by temperature change, the amplitudes of the signals outputted from the output terminals 51 to 54 and the RF terminal 55 fluctuate according to temperature change, thereby losing the stability of signal quality. Therefore, in the present invention, the second photodiode 15 is provided, which detects the parasitic capacitance of the second photodiode 15. The detection result is used for the control signals for controlling the reverse bias voltages of the first and second photodiodes 11 to 15. This maintains the optical sensitivity of the first photodiodes 11 to 14 regardless of temperature change, thereby stabilizing output signals to improve the signal quality thereof.

Hereinafter, the operation of the amplifier circuit illustrated in FIG. 2 is described. A laser light incident on the photodiode 11 is converted into an electric current. The electric current generated in the photodiode 11 flows through the feedback resistor 31. The electric current flowing through the feedback resistor 31 is converted into a voltage by the operational amplifier 21, and outputted from the output terminal 51 as a voltage signal. Similarly, the laser lights incident on the photodiodes 12 to 14 are converted into electric currents. The electric currents flow through the feedback resistors 32 to 34 connected to the photodiodes 12 to 14, respectively. The electric currents flowing through the feedback resistors 32 to 34 are converted into voltages by the operational amplifiers 22 to 24, and outputted from the output terminal 52 to 54 as voltage signals. The signals outputted from the output terminals 51 to 54 are used as servo signals. On the other hand, the voltages of the output terminals 51 to 54 are converted into electric currents by the resistors 41 to 44 connected thereto. The electric currents are added up into one electric current signal. The electric current signal is converted into a voltage signal by the resistor 45 and the operational amplifier 25, and then outputted from the RF output terminal 55 as an RF signal.

Figure 3:
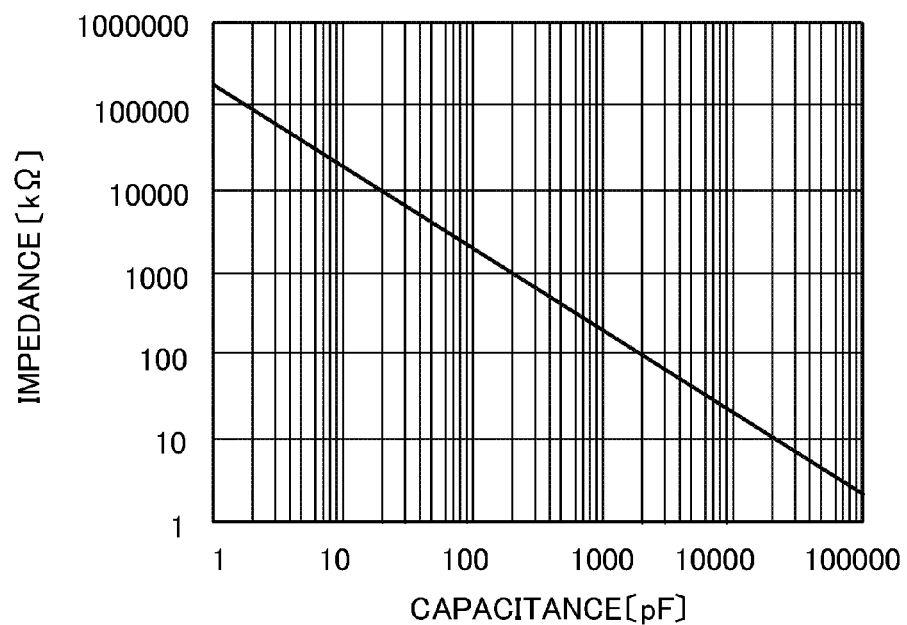
FIG. 3 illustrates the capacitance value-impedance characteristic of a capacitor.

In this case, to the cathodes of the photodiodes 11 to 15, the reverse bias voltage generated in the reverse-bias-voltage control circuit 61 is applied. The anode of the photodiode 15 is connected to the parasitic-capacitance detecting circuit 65 so that the parasitic capacitance value of the photodiode 15 is detected. In order to detect the parasitic capacitance value, impedance is measured. The impedance of a parasitic capacitance is commonly measured with a signal having a frequency of 1 kHz. The impedance of a capacitance is obtained by $1/(j\omega C)$. In this case, $\omega=2\pi f$. For example, if a parasitic capacitance is 10 pF, the impedance thereof is approximately 16000 kΩ. FIG. 3 illustrates the impedance change relative to the parasitic capacitance when the signal of 1 kHz is inputted. As the capacitance value becomes larger, the impedance decreases. As the capacitance value becomes smaller, the impedance increases. In this way, the parasitic capacitance value of the photodiode 15 is detected, and the reverse bias voltage of the reverse-bias-voltage control circuit 61 is adjusted according to the detection result. In addition, there is a correlation between the parasitic capacitance of the photodiode 15 and the depletion layer width thereof. Since the depletion layer width varies according to ambient temperature change, the parasitic capacitance also varies in the result. Since the same reverse bias voltage is applied to the photodiodes 11 to 15, the photodiode 15 has the same the depletion layer width as those of the photodiodes 11 to 14. Furthermore, there is a correlation between the depletion layer widths of the photodiodes 11 to 14 and the optical sensitivity thereof. Specifically, controlling the parasitic capacitance value of the second photodiode 15 means controlling the optical sensitivity of the first photodiodes 11 to 14. Therefore, the parasitic capacitance of the second photodiode 15 is maintained at a constant value by the reverse bias voltage of the reverse-bias-voltage control circuit 61, thereby stabilizing the optical sensitivity of the first photodiodes 11 to 14.

(Example of Reverse-Bias-Voltage Control Circuit)

Figure 4:
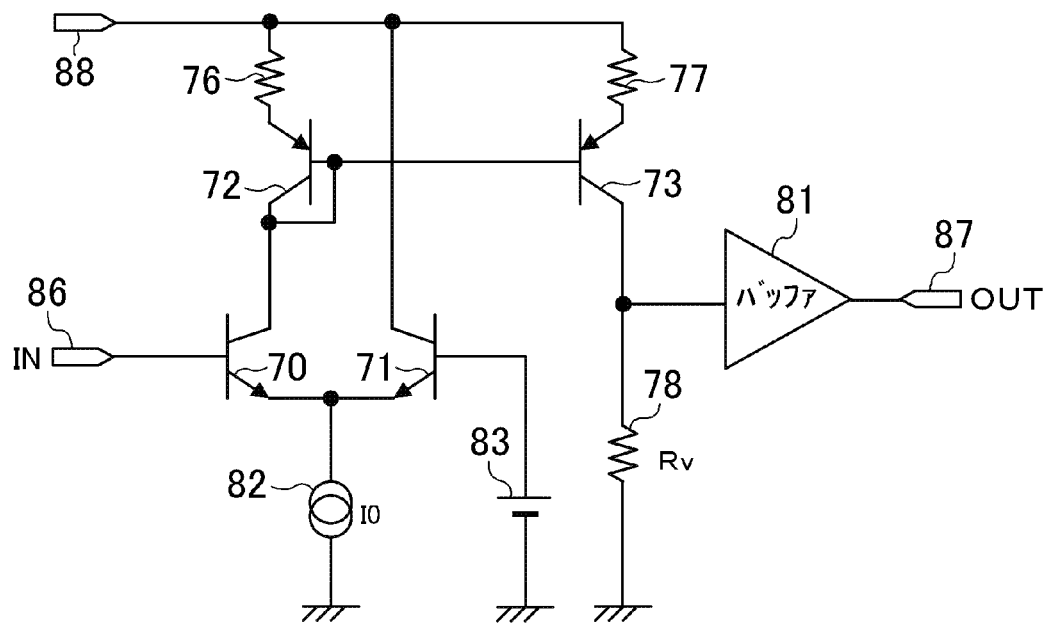
FIG. 4 illustrates an example of a reverse-bias-voltage control circuit of the amplifier circuit.

FIG. 4 illustrates an example of the reverse-bias-voltage control circuit 61 of FIG. 2.

Referring to FIG. 4, 70 and 71 denote NPN transistors, 72 and 73 denote PNP transistors, 76 to 78 denote resistors, 81 denotes a buffer, 82 denotes a constant current source, 83 denotes a reference voltage source, 86 denotes an input terminal, 87 denotes an output terminal, and 88 denotes a supply voltage terminal.

The NPN transistors 70 and 71 are included in a differential amplifier. The emitters of the NPN transistors 70 and 71 are connected to the constant current source 82. The base of the NPN transistor 71 is connected to the reference voltage source 83. The base of the NPN transistor 70 is connected to the input terminal 86. The PNP transistors 72 and 73 and the resistors 76 and 77 are included in a current mirror circuit. The collector of the NPN transistor 70 is connected to the collector and the base of the PNP transistor 72, and the base of the PNP transistor 73. The collector of the PNP transistor 73 is connected to the resistor 78 and the buffer 81. The output of the buffer 81 is connected to the output terminal 87.

Next, the operation of the reverse-bias-voltage control circuit 61 of FIG. 4 is described. The voltage corresponding to the capacitance value detected by the parasitic-capacitance detecting circuit 65 of FIG. 2 is applied to the input terminal 86 of FIG. 4. The differential amplifier including the NPN transistors 70 and 71 makes a comparison between the voltage applied to the input terminal 86 and the reference voltage from the reference voltage source 83, so that an appropriate electric current flows from the collector of the NPN transistor 70. The electric current flowing from the collector of the NPN transistor 70 is then lead to the collector of the PNP transistor 73 by the current mirror circuit including the PNP transistors 72 and 73 and the resistors 76 and 77. The electric current which has passed through the collector of the PNP transistor 73 is converted into a voltage by the resistor 78. The converted voltage is converted into an impedance signal and outputted through the buffer 81. The buffer 81 prevents the reverse bias voltage from fluctuating due to the impedances of the elements connected in a stage later than the output terminal 87. This circuit configuration achieves a reverse-bias-voltage control circuit for adjusting the voltage of the output terminal 87 in response to the voltage change of the input terminal 86.

In the amplifier circuit illustrated in FIG. 2, when a laser light is incident on the first photodiodes 11 to 14, the voltage of the output terminals 51 to 54 becomes lower than the voltage value of the terminal 56 of the reference voltage source 1 (Vref). However, since the voltage value of the output terminal commonly increases when a laser light is incident, an inverting amplifier may be added in a stage later than the output terminals 51 to 54.

As has been described above, the parasitic-capacitance detecting circuit 65 detects the parasitic capacitance value of the second photodiode 15 different from the first photodiodes 11 to 14. The parasitic capacitance of the second photodiode 15 is maintained at a constant value by controlling the reverse bias voltage of the reverse-bias-voltage control circuit 61. As a result, the optical sensitivity of the first photodiodes 11 to 14 is maintained at a constant value. This configuration achieves signals resistant to temperature change, thereby improving signal quality.

(Second Embodiment)

Figure 5:
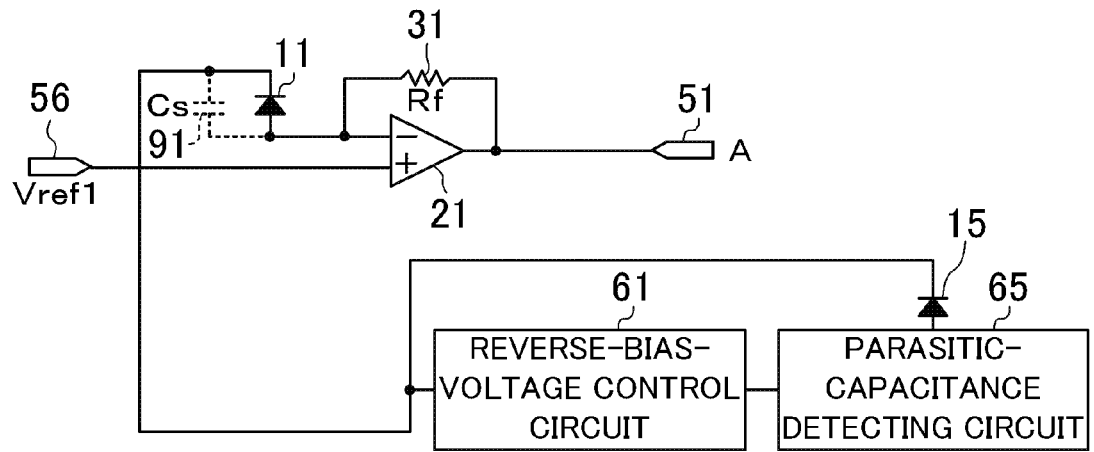
FIG. 5 is a partially cutaway view illustrating a part of an amplifier circuit according to a second embodiment of the present invention.

Referring next to FIG. 5, a second embodiment of the present invention is described.

If the amount of the laser light incident on the photodiodes 11 to 14 of FIG. 2 is smaller, for reasons such that the optical pickup unit 3 of FIG. 1 makes a record on or plays an optical disc 1 having a low reflectivity, and that the optical system in the optical pickup unit 3 has a low transmission efficiency, the amplitudes of the signals outputted from the output terminals 51 to 54 and the RF output terminal 55 also become smaller. In this case, the signal-to-noise ratio when the front-end processor 4 performs signal processing in the later stage, thereby causing jitter and poor servo characteristics. Therefore, in this embodiment, an avalanche photodiode (APD) is employed for first photodiodes 11 to 14. This configuration prevents the signal-to-noise ratio from becoming worse even when the amount of incident laser light is smaller, thereby maintaining signal quality. This configuration further supports playing at faster speeds.

FIG. 5 is a partially cutaway view illustrating a part of the amplifier circuit FIG. 2 in detail. The structural members which have been illustrated in FIG. 2 have the same reference numbers, and the descriptions thereof are omitted here. In FIG. 5, the first photodiode 11 is illustrated as a representative example.

In FIG. 5, 91 denotes a parasitic capacitance which accompanies the first photodiode 11. In FIG. 2, the parasitic capacitance has been omitted for simplification. In FIG. 5, Cs means the parasitic capacitance value of the parasitic capacitance 91, and Rf means the resistance value of the feedback resistor 31.

A laser light is incident on the first photodiode 11. The electric current signal generated in the photodiode 11 flows through the feedback resistor 31. The electric current signal is converted into a voltage signal in the amplifier circuit 21, and then outputted from the output terminal 51. For example, a description is given for the case when a Blu-ray disc (BD) is played, which employs a blue-violet laser as a light source. The photodiode 11 commonly includes a PIN photodiode, which is driven at lower voltage and easier to handle. The optical sensitivity of a PIN photodiode employing a blue-violet laser is approximately 0.3 A/W (theoretical value: 0.328 A/W). On the assumption that the reflectivity of a single-layer Blu-ray disc is approximately 10%, in consideration of the transmission efficiency of the optical system, the resistance value Rf of the feedback resistor 31 has to be approximately 60 k$\Omega$, in order to obtain a desired output amplitude.

Next, a description is given for the case of a Blu-ray disc having lower reflectivity. The reflectivity of a dual-layer Blu-ray disc is approximately 5%, which is about half of that of a single-layer Blu-ray disc. In this case, the resistance value Rf of the feedback resistor 31 has to be approximately 120 k$\Omega$, which is twice as high as that in the case of single-layer disc. Specifically, the resistance value Rf of the feedback resistor 31 has to be doubled to obtain a desired signal amplitude if a single-layer Blu-ray disc is replaced with a dual-layer one. However, if the resistance value Rf of the feedback resistor 31 is doubled, the thermal noise generated in the feedback resistor 31 will increase by the square root of 2. In other words, the signal-to-noise ratio is reduced by approximately 3 dB. Specifically, if the signal-to-noise ratio is reduced, a signal is interrupted by noise, thereby causing jitter and poor servo characteristics. Therefore, an avalanche photodiode (APD) is employed for the first photodiode 11 so that the photodiode 11 has an optical sensitivity several times to dozen times greater. Instead, the resistance value Rf of the feedback resistor 31 is reduced, thereby reducing the thermal noise generated in the feedback resistor 31. In this case, noise reduction means the improvement in signal-to-noise ratio. As a result, signal quality is improved.

Figure 6:
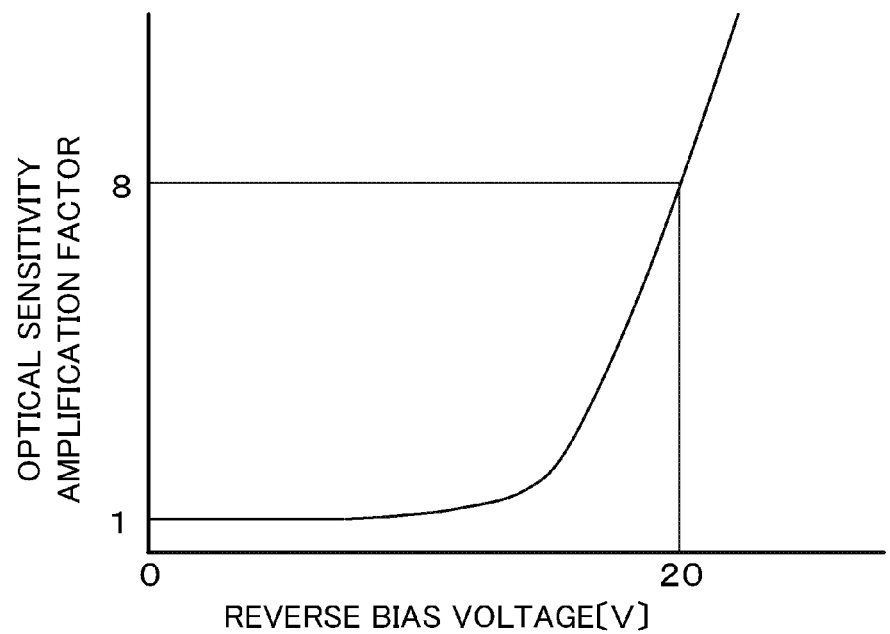
FIG. 6 illustrates the relation between the optical sensitivity of the avalanche photodiode of the amplifier circuit and the dependence characteristics thereof relative to the reverse bias voltage.

A description is given for an avalanche photodiode. An APD is a PN diode in which the junction is reverse-biased with a large voltage to form a large electric field in the depletion layer. This enables light carriers to be fully-energized. The carriers collide with crystal lattices to generate new electron-hole pairs (ionization). The newly generated electron-hole pairs further generate new electron-hole pairs as a chain reaction, thereby enabling the APD to have amplification function. The amplification function varies according to the applied reverse bias voltage. FIG. 6 illustrates the relation therebetween. As illustrated in FIG. 6, when the reverse bias voltage reaches 20 V, the amplification factor of an APD approximately eight times as large as that of a PIN photodiode. An avalanche photodiode improves signal quality even for discs having a low reflectivity such as dual layer BD.

However, the optical sensitivity of an APD is subject to temperature change. A description is given therefore in detail. In general, the amplification factor of an APD decreases as the temperature rises at a fixed reverse bias voltage. As the temperature rises, the vibration of crystal lattices increases. The carriers collide with crystal lattices before the energy thereof reaches the level at which ionization could occur, so the probability of occurrence of chain reaction becomes low, thereby reducing the amplification factor. In this embodiment, the first photodiode 11 and the second photodiode 15 of FIG. 5 employ the identical APDs. The parasitic capacitance of the second photodiode 15 is detected by the parasitic-capacitance detecting circuit 65. According to the detection result, the reverse bias voltages of the first photodiode 11 and the second photodiode 15 are adjusted by the reverse-bias-voltage control circuit 61. Specifically, the optical sensitivity of the first photodiode 11 is maintained at a constant value, regardless of ambient temperature change.

Hereinafter, a description is given for frequency characteristics and noise characteristics of the amplifier circuit Referring to FIG. 7, the frequency characteristics of the amplifier circuit of FIG. 5 are described. The laser light reflected from the optical disc 1 of FIG. 1 is incident on the photodiode 11. The laser light incident on the photodiode 11 carries information stored in the optical disc 1 is intermittently incident thereon. The incident laser light is converted into an electric current signal. The converted electric current signal is converted into a voltage signal by the feedback resistor 31 and the operational amplifier 21, and then outputted from the output terminal 51. For example, the shortest length of the mark recorded in a Blu-ray disc is 2T. If the length is converted into a frequency, the single speed of Blu-ray disc corresponds to f–3 dB=15.5 MHz. If the information of 2T stored in a Blu-ray disc is played at octuple speed, the frequency band of the amplifier circuit requires f–3 dB=120 MHz or more. The frequency characteristics of the amplifier circuit of FIG. 5 are determined by a pole frequency fp1, a pole frequency fp2, and the gain of the amplifier circuit. The pole frequency fp1 is determined by the feedback resistor 31 and the parasitic capacitance 91 of the photodiode 11. The pole frequency fp2 is determined by the phase compensating capacitance (not shown) included in the operational amplifier 21 to prevent the oscillation of the amplifier circuit.

Figure 7:
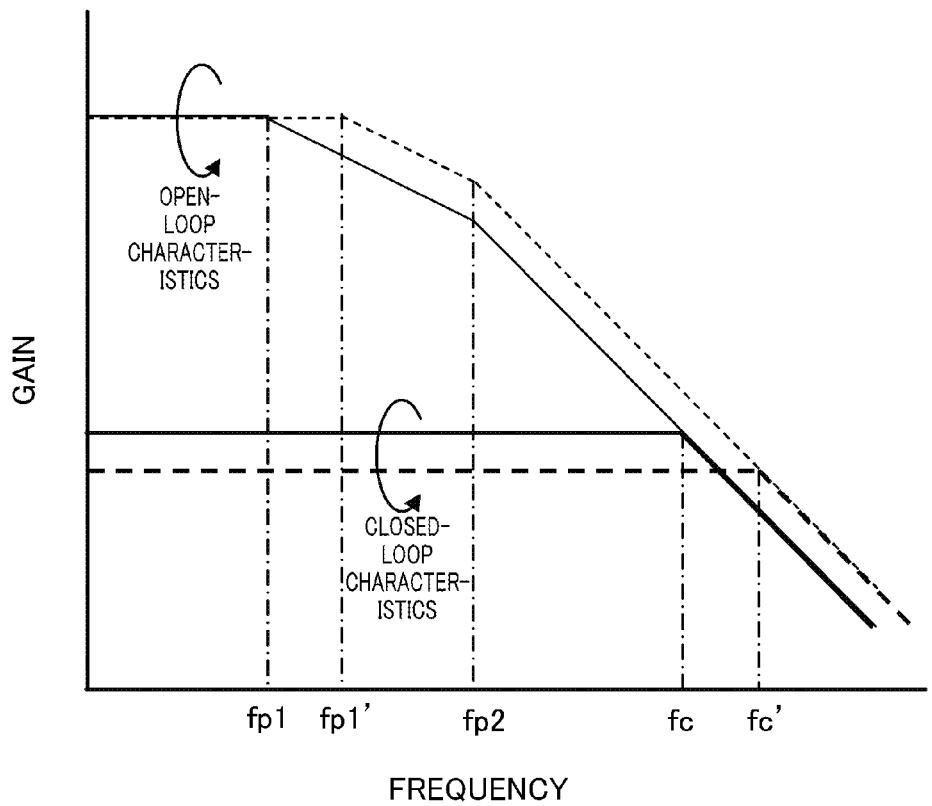
FIG. 7 illustrates the frequency characteristics of the amplifier circuit at output level.

FIG. 7 is a skeleton Bode diagram illustrating gain -frequency characteristics of the amplifier circuit. In FIG. 7, the thin line denotes the characteristics of the amplifier circuit when the circuit is opened, and the thick line denotes the characteristics thereof when the circuit is closed. The open-loop pole frequency fp1 is determined by the resistance value Rf of the feedback resistor 31, and the parasitic capacitance value Cs of the parasitic capacitance 91. The frequency fp1 is obtained by $1/(2 \times \pi \times Cs \times Rf)$. For example, the reflectivity of a single-layer Blu-ray disc is approximately 10%, and the laser light reflected therefrom is received by the photodiode 11. If the photodiode 11 is a PIN photodiode, the blue optical sensitivity thereof is approximately 0.3 A/W (theoretical value: 0.328 A/W). In order to obtain desired output signal amplitude, the resistance value Rf of the feedback resistor 31 has to be 60 k$\Omega$. Furthermore, since the parasitic capacitance value Cs of the photodiode 11 is approximately 0.5 pF, the pole frequency $fp1=1/(2 \times \pi \times 0.5p \times 60k)$ =approximately 5 MHz. The pole frequency fp2 determined by the phase compensating included in the operational amplifier 21 is approximately 60 MHz. The cutoff frequency fc of the closed-loop characteristics is determined by the frequency characteristics obtained when the circuit is opened and gain obtained when the circuit is closed. This circuit achieves fc=120 MHz. Next, in FIG. 7, the dotted line denotes the frequency characteristics when an APD is employed for the photodiode 11. An APD has an optical sensitivity several times to dozen times greater than that of a conventional PIN photodiode. On the assumption that the optical sensitivity of an APD is 2.4 A/W, which is eight times greater than that of a conventional PIN photodiode, the resistance value Rf of the feedback resistor 31 is approximately 7.5 kΩ. Specifically, in FIG. 7, the pole frequency fp1 extends toward high frequencies up to fp1', thereby reducing the gain of the amplifier circuit. As a result, the cutoff frequency fc reaches fc' toward high frequencies, thereby achieving speeding up.

Next, a description is given for noise characteristics of the amplifier circuit of FIG. 5 while an optical disc is being played. The noise components are almost determined by the thermal noise generated in the feedback resistor 31. The loudness thereof is obtained by the square root of (4 kT×Rf×Δf). In this case, k: Boltzmann constant, T: absolute temperature: and Δf: bandwidth. On the assumption that the optical sensitivity obtained when an APD is employed for the photodiode 11 is 2.4 A/W, which is eight times greater than that of a PIN photodiode, the feedback resistor 31 is approximately 7.5 kΩ. As a result, the noise components will decrease by the square root of (⅛). Specifically, if an avalanche photodiode is employed for the photodiode 11, and if the optical sensitivity is set to be eight times greater than that of a PIN photodiode, the feedback resistor 31 becomes one-eighth of the original level. As a result, the noise is reduced by the square root of (⅛), or in other words, approximately −9 dB.

As has been described above, an APD is employed for the first photodiode 11 as in this embodiment, thereby increasing the optical sensitivity of the photodiode 11, as well as reducing the resistance value Rf of the feedback resistor 31. If the feedback resistor value Rf becomes smaller, the frequency characteristics extend toward higher frequencies, thereby reducing the thermal noise generated in the feedback resistor 31. Specifically, the improvements in signal-to-noise ratio and speeding up are achieved at the same time. Signal quality is improved and a high-speed PDIC is achieved.

(Third Embodiment)

Figure 8:
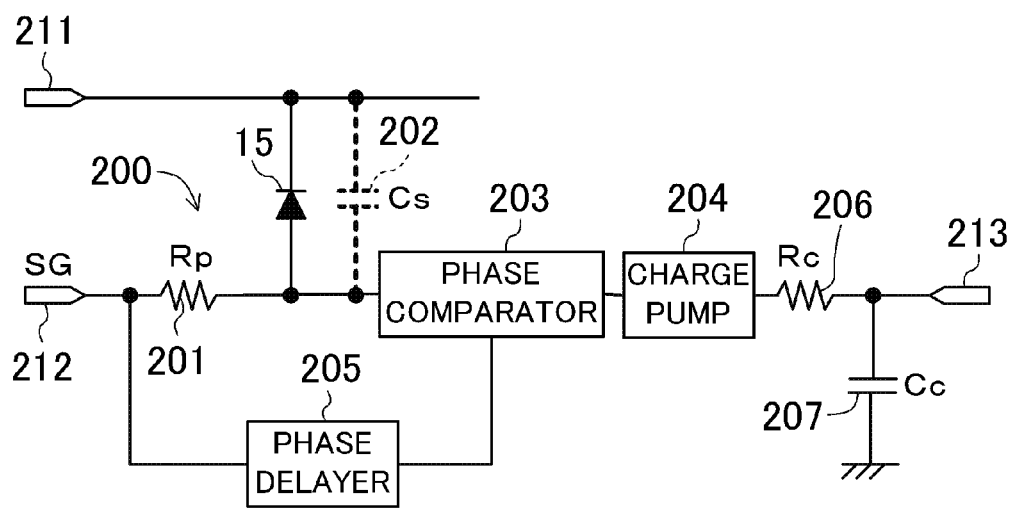
FIG. 8 illustrates a configuration example of a parasitic-capacitance detecting circuit included in an amplifier circuit according to a third embodiment of the present invention.

Referring next to FIG. 8, a third embodiment of the present invention is described.

In the first embodiment and the second embodiment, the photodiodes 11 to 14 of FIG. 2 successfully have stable optical sensitivities resistant to temperature change. In this embodiment, a description is given for the circuit configuration in which more stable control is achieved regardless of temperature change. The signal amplitudes of the output terminals 51 to 54 of FIG. 2 are determined by the electric currents generated in the photodiodes 11 to 14, and the feedback resistors 31 to 34. In order to achieve more stable control, the amount of variation in the resistance values of the feedback resistors 31 to 34 and the temperature changes thereof have to be reduced. Therefore, in this embodiment, a filter including a resistor and a parasitic capacitance is employed as the parasitic-capacitance detecting circuit 65 of FIG. 2. This configuration reduces the amount of variation in the optical sensitivities of the photodiodes 11 to 14 and the feedback resistors 31 to 34, thereby achieving a stable signal amplitude regardless of temperature change. A description is given therefore in detail.

In the amplifier circuit of FIG. 5, the feedback resistor 31 is a semiconductor device including a diffused resistor or a polysilicon resistor. The resistance values of such resistors have individual differences within the range of about ±10% to 20%. Furthermore, the resistance values thereof changes according to ambient temperature within the range of approximately ±1000 to 3000 ppm/° C. If the resistance value of the feedback resistor 31, the amplitude of the signal outputted from the output terminal 51, accordingly. Specifically, if the amplitude of the output signal changes with the change in the resistance value, the ratio of signal to noise also changes, thereby worsening the signal-to-noise ratio. Therefore, this embodiment enables the resistance value of the feedback resistor 31 to be more stable, thereby further improving signal quality in comparison with the second embodiment.

FIG. 8 is a detailed circuit diagram illustrating the parasitic-capacitance detecting circuit 65 of FIG. 5. The structural members which have been illustrated in FIG. 5 have the same reference numbers, and the descriptions thereof are omitted here.

In FIG. 8, 201 denotes a resistor having a resistance value of Rp, 202 a parasitic capacitance of the second photodiode 15. The resistor (second resistor) 201 and the parasitic capacitance 202 of the second photodiode 15 are included in a first filter circuit 200. Also in FIG. 8, 203 denotes a phase comparator, 204 denotes a charge pump, 205 denotes a phase delayer (second filter circuit), 206 denotes a resistor having a resistance value of Rc, 207 denotes a capacitance having a capacitance value of Cc, 211 denotes a reverse bias voltage terminal to which the reverse bias voltage generated in the reverse-bias-voltage control circuit 61 is applied, 212 denotes a reference signal terminal, and 213 denotes an output terminal of the parasitic-capacitance detecting circuit 65. The reference signal terminal 212 is connected to one end of the resistor 201 and the phase delayer 205. The input of the phase comparator 203 is connected to the other end of the resistor 201, the anode of the second photodiode 15 (parasitic capacitance 202), and the output of the phase delayer 205. The output of the phase comparator 203 is connected to the charge pump 204. The output of the charge pump 204 is connected to one end of the resistor 206. The other end of the resistor 206 is connected to the capacitance 207 and the output terminal 213.

Hereinafter, the operation of the parasitic-capacitance detecting circuit 65 illustrated in FIG. 8 is described. A reference signal is inputted to the reference signal terminal 212 and then branched into two. One reference signal is inputted to the phase delayer 205 to be delayed in phase, and then inputted to the phase comparator 203. The other reference signal is inputted to the phase comparator 203 through a 1st-order low-pass filter including the resistor 201 (resistance value Rp) and the parasitic capacitance 202 (capacitance value Cs) of the second photodiode 15. The phase comparator 203 then makes a phase-comparison between the signal which has passed through the low-pass filter (first filter circuit 200) and the signal which has passed through the phase delayer 205 (second filter circuit). The comparison result is inputted to the charge pump 204. The output of the charge pump 204 is smoothed by the resistor 206 (resistance value Rc) and the capacitance 207 (capacitance value Cc), so that an appropriate voltage is outputted from the output terminal 213. When the signal through the phase delayer 205 and the signal through the low-pass filter are in the same phase, no signal is sent to the charge pump 204. The voltage determined by the electric charge held in the capacitance 207 (capacitance value Cc) is outputted from the output terminal 213.

Figure 9A:
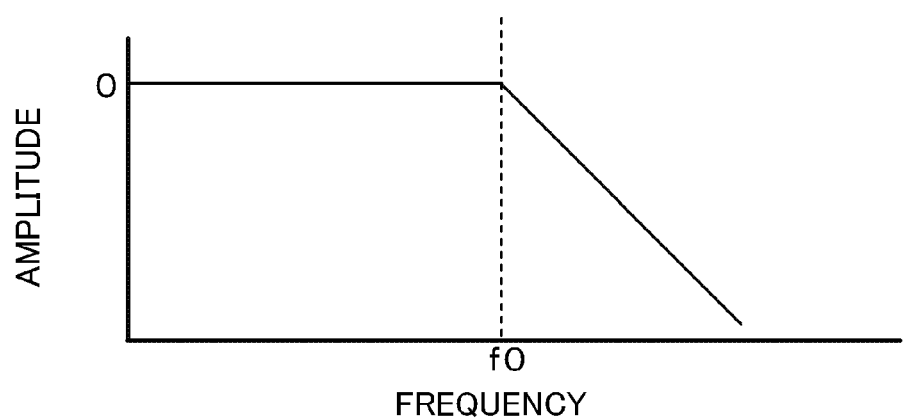
FIG. 9(a) illustrates the amplitude characteristics of the resistor and the parasitic capacitance of the parasitic-capacitance detecting circuit relative to the frequency of a 1st-order low-pass filter.
Figure 9B:
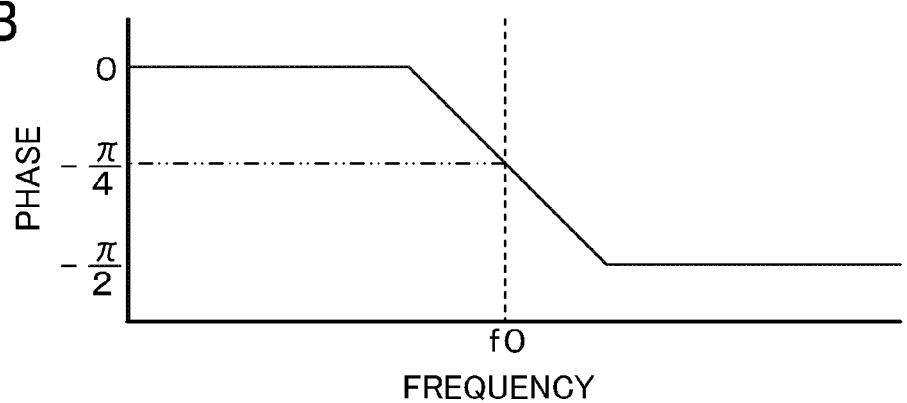
FIG. 9(b) illustrates the phase characteristics thereof relative to the frequency of the 1st-order low-pass filter.

Next, referring to FIG. 8, a detailed description is hereinafter given for the operations of the low-pass filter including the resistor 201 and the parasitic capacitance 202 of the second photodiode 15, the phase delayer 205, and the phase comparator 203. A reference signal is inputted to the reference signal terminal 212. The resistor 201 (resistance value Rp) and the parasitic capacitance 202 (capacitance value Cc) of the second photodiode 15 are included in the 1st-order low-pass filter. FIGS. 9(a), 9(b), and 9(c) illustrate the transfer characteristics of the 1st-order low-pass filter. FIG. 9(a) is a skeleton Bode diagram illustrating the amplitude-frequency characteristics. FIG. 9(b) is a skeleton Bode diagram illustrating the phase-frequency characteristics. The cutoff frequency where the filter attenuates the amplitude by 3 dB is obtained by $f0=1/(2\pi \times Cc \times p)$. On the other hand, referring to FIG. 9(b), the phase is delayed by $\pi/4$ at the cutoff frequency f0. For example, if a sine wave of 5.3 MHz is inputted as a reference signal, on the assumption that the resistance value Rp of the resistor 201 is 60 k$\Omega$ and the capacitance value Cs of the parasitic capacitance 202 of the second photodiode 15 is 0.1 pF, the cutoff frequency $f0=1/(2\times\pi\times60\text{ k}\Omega\times0.1\text{ pF})$=approximately 26 MHz. Specifically, after the 5.3-MHz reference signal passes through the low-pass filter including the resistor 201 and the parasitic capacitance 202, the phase delay (X) falls within $-(\pi/4)<X<0$. On the other hand, since the phase delayer 205 is preset so that the phase is delayed by $\pi/4$, a phase difference occurs when the signal which has passed through the 1st-order low-pass filter and the signal which has passed through the phase delayer 205 are inputted to the phase comparator 203. The charge pump 204 is then operated. As the charge pump 204 is operated, the capacitance 207 (capacitance value Cc) is charged or discharged, thereby adjusting the voltage of the output terminal 213. The voltage of the output terminal 213 adjusts the reverse bias voltage of the photodiodes 11 to 15 through the reverse-bias-voltage control circuit 61 of FIG. 5. Next, the adjusted reverse bias voltage further adjusts the reverse bias voltage of the second photodiode 15 connected to the voltage terminal 211 of FIG. 8, thereby changing the value of the parasitic capacitance 202 (capacitance value Cs) of the second photodiode 15. When the capacitance value Cs of the parasitic capacitance 202 is approximately 0.5 pF, the cutoff frequency f0 of the 1st-order low-pass filter including the resistor 201 (resistance value Rp) and the parasitic capacitance 202 (capacitance value Cs) of the second photodiode $15=1/(2\times\pi\times60\text{ k}\Omega\times0.5\text{ pF})$=5.3 MHz, thereby delaying the phase of the reference signal by $\pi/4$. The phase delayer 205 is preset so that the phase is delayed by $\pi/4$, and the phase comparator 203 makes a phase-comparison with the phase which has passed through the low-pass filter including the resistor 201 and the parasitic capacitance 202. In this case, since the signal from the low-pass filter and the signal from the phase delayer 205 are in the same phase, the phase comparator 203 sends a signal for turning OFF the charge pump 204. Since the charge pump 204 is turned OFF, the capacitance 207 (capacitance value Cc) is kept charged, thereby maintaining the voltage of the output terminal 213 and then stabilizing the feedback circuit.

The resistance value Rp and the temperature coefficient of the second resistor 201 may be the same as the resistance value and the temperature coefficient of the feedback resistors (first resistors) 31 to 34 of FIG. 2. The second photodiode 15 having the same parasitic capacitance as the first photodiodes 11 to 14 may be included in a low-pass filter. This configuration enables the output voltages of the output terminals 51 to 55 to obtain stable signal quality regardless of temperature change.

This embodiment relates to the case in which the phase delayer 205 delays the phase by $\pi/4$. However, if flexible setting becomes possible for the phase delayer 205, adjustments are also possible so that appropriate optical sensitivity is obtained, such as mask layout.

Furthermore, this embodiment relates to the case in which the low-pass filter including the resistor 201 and the parasitic capacitance 202 is employed. However, other filters and circuits which change the phase according to frequency are also applicable. For example, a hi-pass filter including the resistor 201 and the parasitic capacitance 202 may be employed.

(Example of Phase Comparator)

Figure 10:
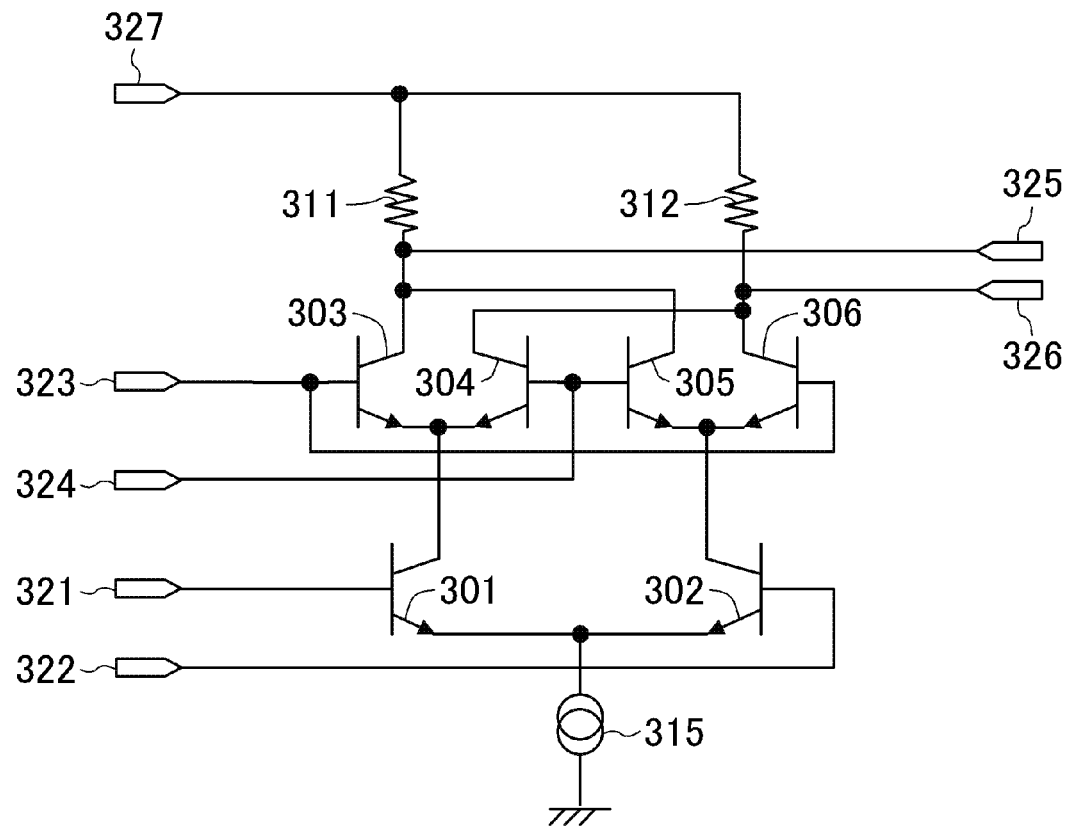
FIG. 10 illustrates an example of a phase comparator included in the parasitic-capacitance detecting circuit.

FIG. 10 illustrates a configuration example of the phase comparator 203 of FIG. 8.

Referring to FIG. 10, 301 to 306 denote NPN transistors, 311 and 312 denote resistors, 315 denotes a constant current source, 321 and 322 denote input signal A terminals, 323 and 324 denote input signal B terminals, 325 and 326 denote output terminals, 327 denotes a supply voltage terminal. The NPN transistors 301 and 302 are included in a differential amplifier circuit. The bases of the NPN transistors 301 and 302 are connected to the input signal A terminals 321 and 322, respectively. Both emitters of the NPN transistors 301 and 302 are connected to the constant current source 315. The NPN transistors 303 and 304 are included in a differential amplifier circuit. The bases of the NPN transistors 303 and 304 are connected to the input signal B terminals 323 and 324, respectively. Both emitters of the NPN transistors 303 and 304 are connected to the collector of the NPN transistor 301. Similarly, the NPN transistors 305 and 306 are included in another differential amplifier circuit. The bases of the NPN transistors 305 and 306 are connected to the input signal B terminals 324 and 323. Both emitters of the NPN transistors 305 and 306 are connected to the collector of the NPN transistor 302. Both collectors of the NPN transistor 303 and 305 are connected to the resistor 311. Similarly, both collectors of the NPN transistors 304 and 306 are connected to the resistor 312. The resistors 311 and 312 are connected to the output terminals 325 and 326, respectively.

Figure 11A:
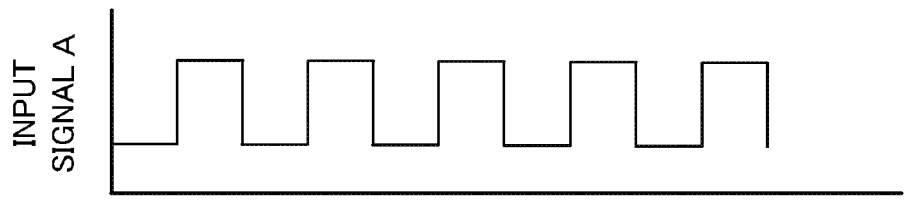
FIG. 11(a) illustrates an input signal to an input terminal A of the phase comparator included in the parasitic-capacitance detecting circuit.
Figure 11B:
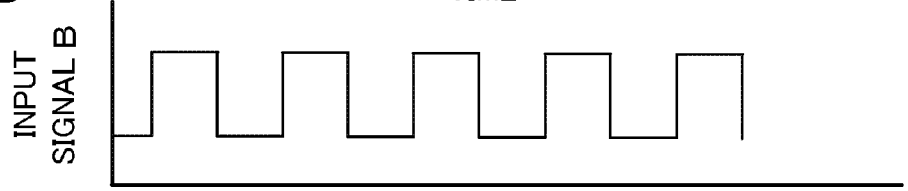
FIG. 11(b) illustrates an input signal to an input terminal B of the phase comparator, which is different in phase from the input signal to the input terminal A.
Figure 11C:
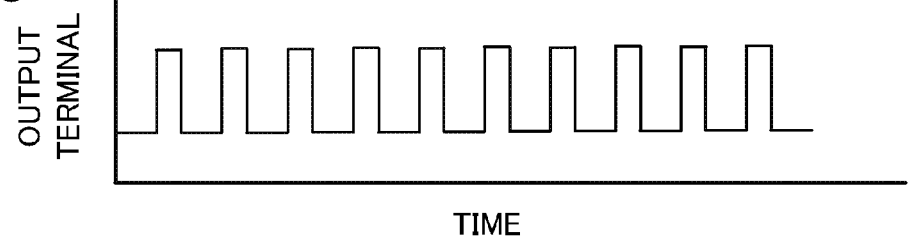
FIG. 11(c) illustrates an output signal from an output terminal of the phase comparator.

The operation of the phase comparator of FIG. 10 is described in detail. First, a description is given for the case in which the signals to the input signal A terminals 321 and 322 differ in phase from the signals to the input signal B terminals 323 and 324. When a Low signal is inputted to the input signal A terminal 321, a Hi signal to the input signal A terminal 322, a Low signal to the input signal B terminal 323, and a Hi signal to the input signal B terminal 324, a Low signal is outputted from the output terminal 325, and a Hi signal outputted from the output terminal 326. Next, when a Low signal is inputted to the input signal A terminal 321, a Hi signal to the input signal A terminal 322, a Hi signal to the input signal B terminal 323, and a Low signal to the input signal B terminal 324, a Hi signal is outputted from the output terminal 325, and a Low signal outputted from the output terminal 326. Furthermore, when a Hi signal is inputted to the input signal A terminal 321, a Low signal to the input signal A terminal 322, a Low signal to the input signal B terminal 323, and a Hi signal to the input signal B terminal 324, a Low signal is outputted from the output terminal 325, and a Hi signal outputted from the output terminal 326. Moreover, when a Hi signal is inputted to the input signal A terminal 321, a Low signal to the input signal A terminal 322, a Hi signal to the input signal B terminal 323, and a Low signal to the input signal B terminal 324, a Low signal is outputted from the output terminal 325, and a Hi signal outputted from the output terminal 326. FIGS. 11(a), (b), and (c) illustrate the series of operations. FIG. 11(a) illustrates an input signal to the input signal A terminals 321 and 322. FIG. 11(b) illustrates an input signal to the input signal B terminals 323 and 324. FIG. 11(c) illustrates an output signal from the output terminals 325 and 326. The signal of FIG. 11(a) is inputted to the input signal A terminals 321 and 322. The signal of FIG. 11(b) is inputted to the input signal B terminals 323 and 324. When the signal of FIG. 11(a) and the signal of FIG. 11(b) are different in phase, the signal of FIG. 11(c) is outputted from the output terminals 325 and 326.

Figure 12A:
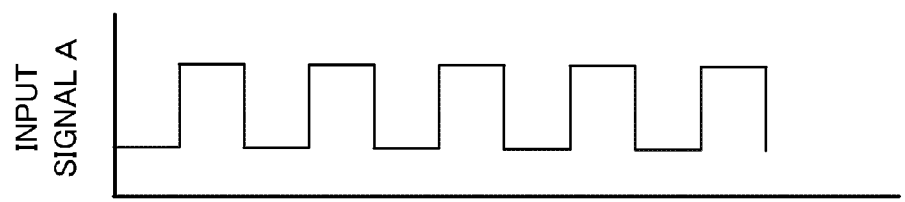
FIG. 12(a) illustrates an input signal to an input terminal A of the phase comparator included in the parasitic-capacitance detecting circuit.
Figure 12B:
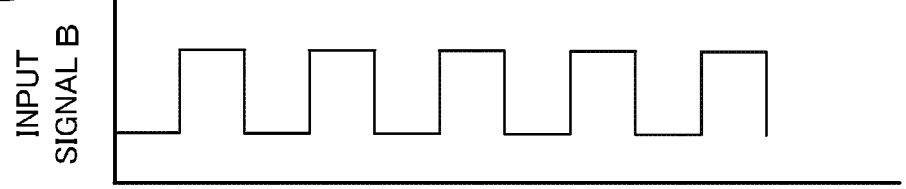
FIG. 12(b) illustrates an input signal to an input terminal B of the phase comparator, which is in the same phase as the input signal to the input terminal A.
Figure 12C:
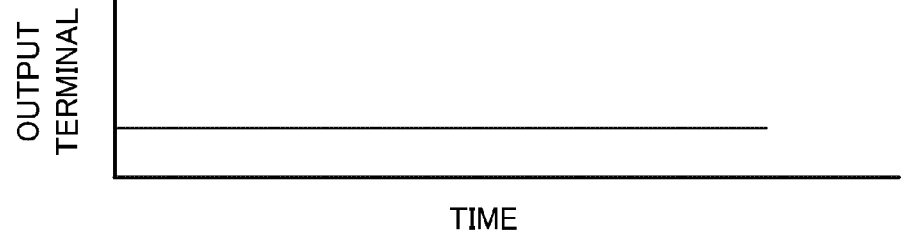
FIG. 12(c) illustrates an output signal from an output terminal of the phase comparator.

Next, a description is given for the case in which the signals to the input signal A terminals 321 and 322 and the signals to the input signal B terminals 323 and 324 are in the same phase. When a Low signal is inputted to the input signal A terminal 321, a Hi signal to the input signal A terminal 322, a Low signal to the input signal B terminal 323, and a Hi signal to the input signal B terminal 324, a Low signal is outputted from the output terminal 325, and a Hi signal outputted from the output terminal 326. Next, when a Hi signal is inputted to the input signal A terminal 321, a Low signal to the input signal A terminal 322, a Hi signal to the input signal B terminal 323, and a Low signal to the input signal B terminal 324, a Low signal is outputted from the output terminal 325, and a Hi signal outputted from the output terminal 326. FIGS. 12(a), (b), and (c) illustrate the series of operations. FIG. 12(a) illustrates an input signal to the input signal A terminals 321 and 322. FIG. 12(b) illustrates an input signal to the input signal B terminals 323 and 324. FIG. 12(c) illustrates an output signal from the output terminals 325 and 326. The signal of FIG. 12(a) is inputted to the input signal A terminals 321 and 322. The signal of FIG. 12(b) is inputted to the input signal B terminals 323 and 324. When the signal of FIG. 12(a) and the signal of FIG. 12(b) are in the same phase, no signal is outputted from the output terminals 325 and 326 as illustrated in FIG. 12(c). Specifically, the charge pump 204 of FIG. 8 connected in a stage later than the output signal terminals 325 and 326 operates when the signals of the input signal A terminals 321 and 322 are different in phase from the signals of the input signal B terminals 323 and 324. On the other hand, the charge pump 204 does not operate when the signals of the input signal A terminals 321 and 322 and the signals of the input signal B terminals 323 and 324 are in the same phase.

This embodiment relates to the case in which the phase comparator 203 illustrated in FIG. 10 includes a multiplication circuit of NPN transistors. However, a digital phase comparator or another phase comparator may also be employed as long as it makes a comparison between the phases of two waveforms.

In this embodiment, the parasitic capacitance 202 of the second photodiode 15 and the resistor 201 have the same configuration as the feedback resistor 31, thereby achieving the stable signal quality resistant to temperature change in terms of the signal amplitude determined by the optical sensitivity and the feedback resistor.

(Fourth Embodiment)

Figure 13:
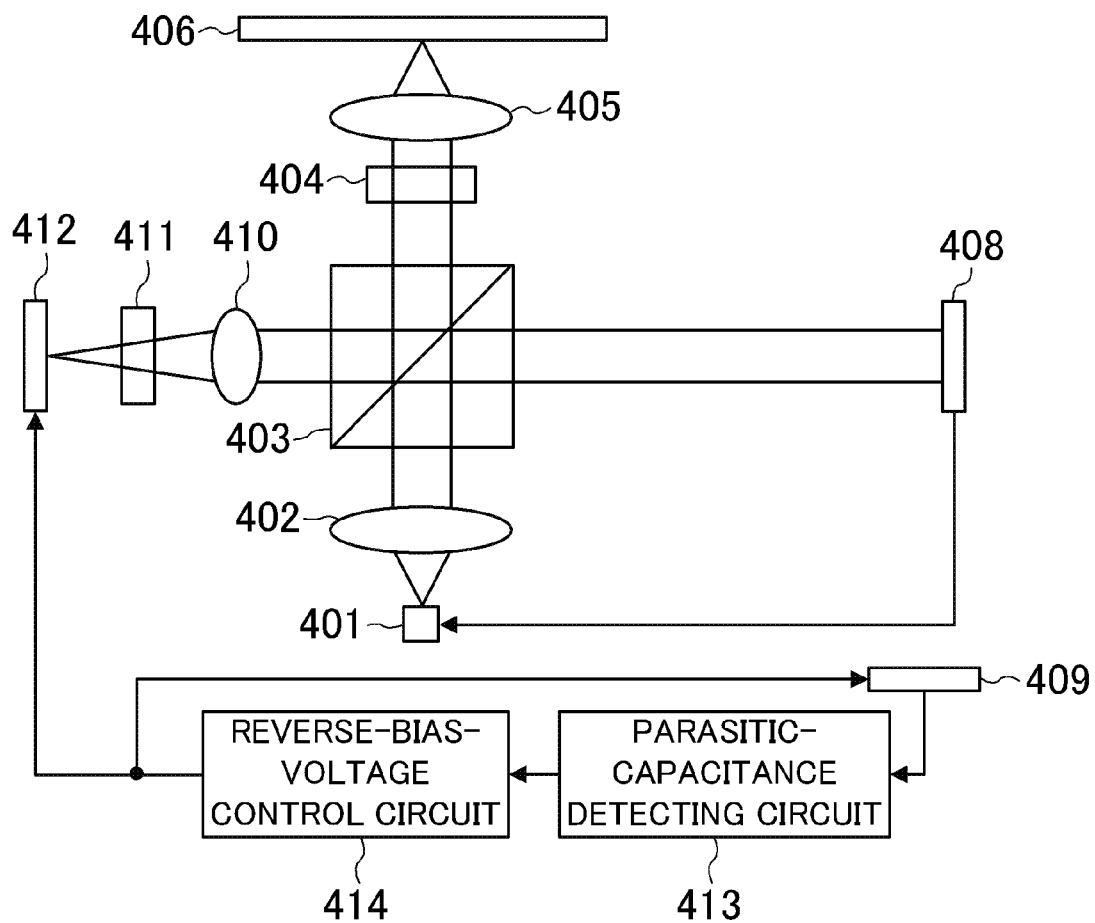
FIG. 13 illustrates an example of an optical pickup device which employs an amplifier circuit according to a fourth embodiment of the present invention.
Figure 14:
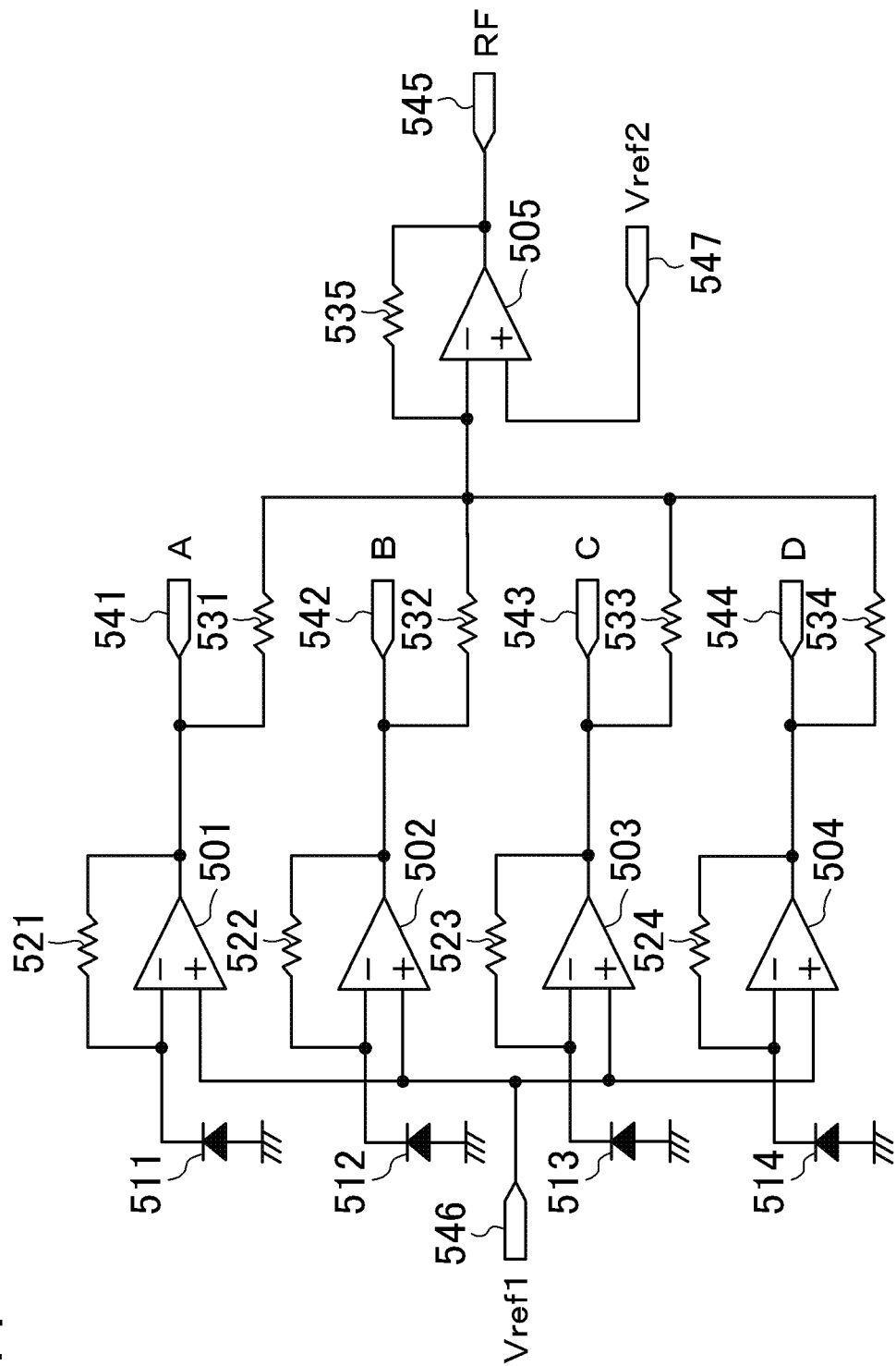
FIG. 14 illustrates a configuration example of a conventional amplifier circuit.
Figure 15:
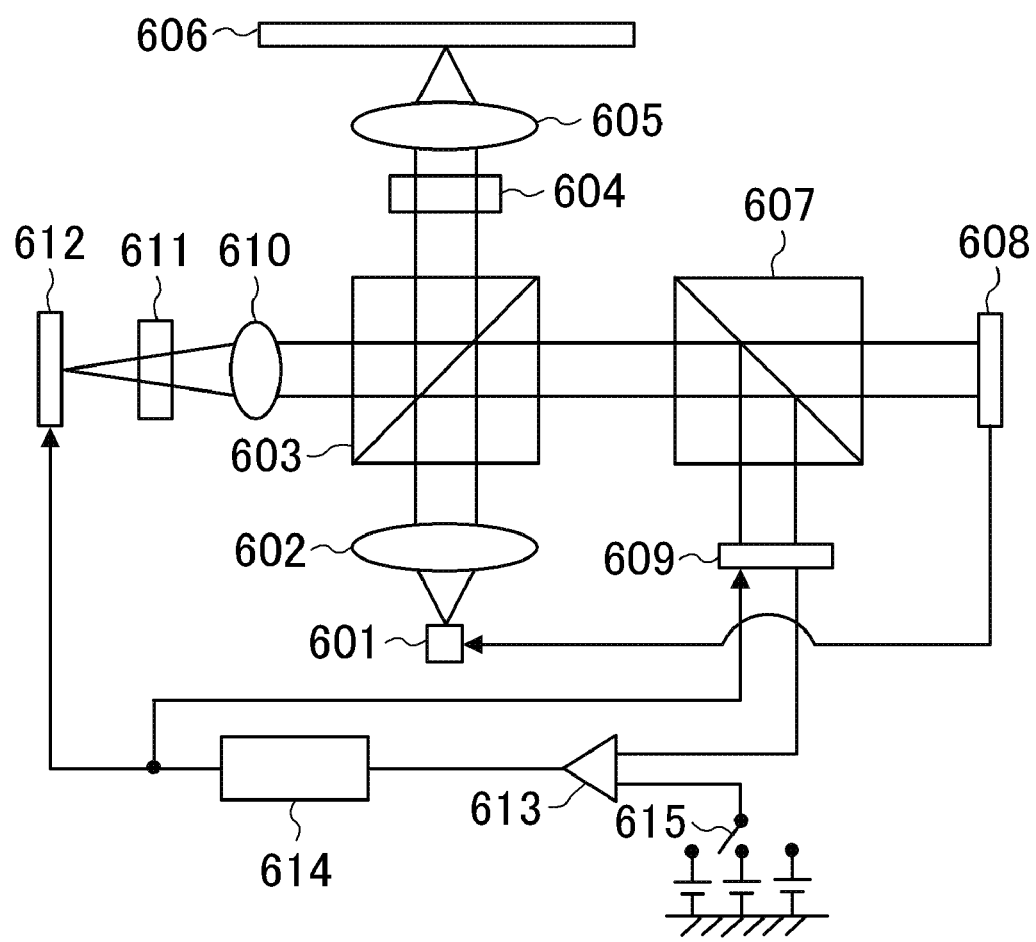
FIG. 15 illustrates a configuration example of a conventional amplifier circuit which employs an avalanche photodiode.
Figure 16:
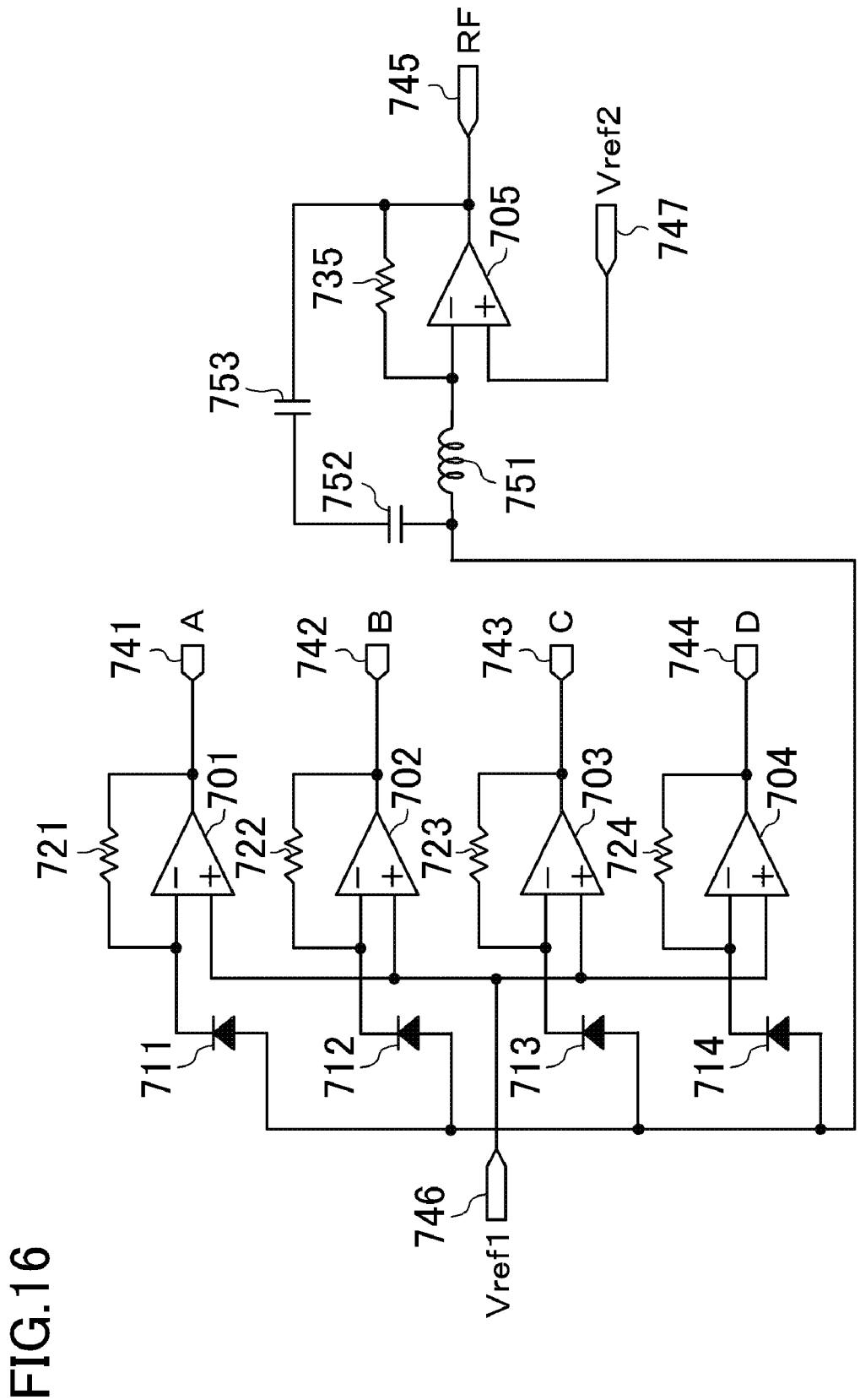
FIG. 16 illustrates another configuration example of the conventional amplifier circuit.

Referring next to FIG. 13, a fourth embodiment of the present invention is described.

FIG. 13 illustrates an example of an optical pickup device which employs the amplifier circuit according to the first embodiment. In this embodiment, the reverse bias of the photodiodes is not controlled, which use the laser light from a laser light source. Therefore, this embodiment achieves an optical pickup unit which resists unstable operations caused by factors such as the displacement of the optical system in a motor vehicle, and the high-speed ON/OFF switching of a laser light source for recording. This embodiment also eliminates the need for the temperature control for stable operation, thereby achieving a simple configuration.

In FIG. 13, 401 denotes a laser light source, 402 denotes a collimator lens, 403 denotes a polarizing beam splitter, 404 denotes a quarter-wave plate, 405 denotes an object lens, 406 denotes an optical disc, 408, 409, and 412 denote photodetectors, 410 denotes a detecting lens, 411 denotes a cylindrical lens, 413 denotes a parasitic-capacitance detecting circuit, and 414 denotes a reverse-bias-voltage control circuit.

Next, the photodiode amplifier circuit of FIG. 13 is described. A laser light emitted from the laser light source 401 is converted from divergent light to parallel light by the collimator lens 402. The parallel laser light is split by the polarizing beam splitter 403 into the laser light directed to the optical disc 406 and the laser light directed to the photodetector 408. After passing through the quarter-wave plate 404, the laser light directed to the optical disc 406 is concentrated with the object lens 405, and applied onto the optical disc 406. The applied laser light is then reflected from the optical disc 406. The reflected laser light is directed to the photodetector 412 through the object lens 405, the quarter-wave plate 404, and the polarizing beam splitter 403. The laser light directed to the photodetector 412 is incident on the photodetector 412 through the detecting lens 410 and the cylindrical lens 411. The photodetector 412 detects the signal information of the optical disc 406 according to laser light intensity. Furthermore, the laser light directed toward the photodetector 408 is incident on the photodetector 408. The photodetector 408 detects the light amount of the laser light source 401, and gives the detection result to the laser light source 401 as feedback, so that the laser light source 401 has a constant light amount. On the other hand, the parasitic-capacitance detecting circuit 413 detects the parasitic capacitance of the photodetector 409, and sends the detection result to the reverse-bias-voltage control circuit 414. Based on the detection result by the parasitic-capacitance detecting circuit 413, the reverse-bias-voltage control circuit 414 generates a reverse bias voltage. The reverse bias voltage generated in the reverse bias control circuit 414 is applied to the photodetectors 409 and 412.

As has been described above, the configuration according to this embodiment achieves a stable optical pickup device which can resist environmental changes, such as vibrations and temperature.

INDUSTRIAL APPLICABILITY

As a stable amplifier circuit resistant to ambient temperature change is provided, thereby achieving stable signal quality even when a disc having a low reflectivity is played at a faster speed. The present invention is useful as an amplifier circuit or as an optical pickup device therewith.

What is claimed is:

1. An amplifier circuit comprising:
   a first photodiode for receiving light;
   an amplifier for converting an electric current from the first photodiode into a voltage;
   a second photodiode different from the first photodiode;
   a parasitic-capacitance detecting circuit for detecting a parasitic capacitance of the second photodiode; and
   a reverse-bias-voltage control circuit for controlling reverse bias voltages of the first photodiode and the second photodiode, according to the detection result by the parasitic-capacitance detecting circuit.

2. The amplifier circuit of claim 1, wherein the first photodiode and the second photodiode include an avalanche photodiode.

3. The amplifier circuit of claim 1, wherein the second photodiode and the first photodiode have the same parasitic capacitance value.

4. The amplifier circuit of claim 1, wherein
the amplifier includes:
- an operational amplifier; and
- a first resistor connected between an input terminal of the operational amplifier and an output terminal of the operational amplifier, and the electric current from the first photodiode is converted into a voltage through the first resistor and amplified by the operational amplifier.

5. The amplifier circuit of claim 1, wherein
the parasitic capacitance detector includes:
- a first filter circuit through which the reference signal passes;
- a second filter circuit through which the reference signal passes; and
- a phase comparator for making a phase-comparison between an output of the first filter circuit and an output of the second filter.

6. The amplifier circuit of claim 5, wherein the second filter circuit includes a phase delayer for delaying a phase of the reference signal.

7. The amplifier circuit of claim 5, wherein the first filter circuit includes a second resistor and a parasitic capacitance of the second photodiode.

8. The amplifier circuit of claim 7, wherein the second resistor and the first resistor have the same resistance value and the same temperature coefficient.

9. An optical pickup device comprising the amplifier circuit of claim 1.

* * * * *